(12) United States Patent
Le Floch

(10) Patent No.: US 9,719,828 B2
(45) Date of Patent: Aug. 1, 2017

(54) SYSTEM FOR ESTIMATING INDIVIDUAL WATER CONSUMPTION

(71) Applicant: OXENA CONSEIL, Saint-Yrieix-sur-Charente (FR)

(72) Inventor: Jacques Le Floch, Saint-Romain (FR)

(73) Assignee: Oxena Conseil, Saint-Yrieix-sur-Charente (FR)

( * ) Notice: Subject to any disclaimer, the term of this patent is extended or adjusted under 35 U.S.C. 154(b) by 244 days.

(21) Appl. No.: 14/418,217

(22) PCT Filed: Jul. 10, 2013

(86) PCT No.: PCT/FR2013/051654
§ 371 (c)(1),
(2) Date: Jan. 29, 2015

(87) PCT Pub. No.: WO2014/020252
PCT Pub. Date: Feb. 6, 2014

(65) Prior Publication Data
US 2015/0160059 A1    Jun. 11, 2015

(30) Foreign Application Priority Data
Jul. 30, 2012  (FR) ..................................... 12 57350

(51) Int. Cl.
*G01F 7/00* (2006.01)
*G01F 15/06* (2006.01)
*G01F 1/66* (2006.01)
*G01D 4/00* (2006.01)

(52) U.S. Cl.
CPC .............. *G01F 15/063* (2013.01); *G01F 1/66* (2013.01); *G01F 1/662* (2013.01); *G01F 15/061* (2013.01); *G01D 4/002* (2013.01); *Y02B 90/241* (2013.01); *Y04S 20/32* (2013.01)

(58) Field of Classification Search
USPC ......................................................... 73/195
See application file for complete search history.

(56) References Cited

U.S. PATENT DOCUMENTS

| | | |
|---|---|---|
| 3,500,676 A | 3/1970 | Palmer |
| 5,040,409 A | 8/1991 | Kiewit |
| 6,161,100 A | 12/2000 | Saar |

(Continued)

FOREIGN PATENT DOCUMENTS

| | | |
|---|---|---|
| EP | 0036658 A1 | 9/1981 |
| EP | 1887327 A1 | 2/2008 |

(Continued)

*Primary Examiner* — Clayton E LaBalle
*Assistant Examiner* — Warren K Fenwick
(74) *Attorney, Agent, or Firm* — Bachman & LaPointe, P.C.

(57) ABSTRACT

The present invention relates to a system for estimating the individual water consumption of a plurality of devices supplied by the secondary fluid distribution network of a user. The system comprises a sleeve able to be fitted around the supply pipe of the secondary network and comprises an electromechanical sensor placed against the outside wall of the supply pipe, and a processor for analyzing the signals delivered by the electromechanical sensor with a view to extracting information characterizing the individual consumption of the devices supplied by the secondary network.

12 Claims, 3 Drawing Sheets

(56) References Cited

U.S. PATENT DOCUMENTS

| | | | |
|---|---|---|---|
| 7,503,227 B2* | 3/2009 | Davis | G01F 1/66 |
| | | | 73/861.42 |
| 8,489,342 B2* | 7/2013 | Dugger | G01F 1/667 |
| | | | 702/45 |
| 2003/0052790 A1 | 3/2003 | Dunstan et al. | |
| 2004/0128034 A1 | 7/2004 | Lenker et al. | |
| 2005/0011258 A1* | 1/2005 | Gysling | G01F 1/363 |
| | | | 73/195 |
| 2006/0009928 A1 | 1/2006 | Addink et al. | |
| 2007/0044572 A1 | 3/2007 | Davis et al. | |
| 2012/0116693 A1 | 5/2012 | Jaeger | |
| 2016/0216141 A1* | 7/2016 | Leaders | G01F 1/667 |

FOREIGN PATENT DOCUMENTS

| | | |
|---|---|---|
| GB | 2082324 A | 3/1982 |
| JP | 2006047243 A | 2/2006 |
| WO | 2006110600 A2 | 10/2006 |
| WO | 2011049957 A2 | 4/2011 |

\* cited by examiner

SYSTEM FOR ESTIMATING INDIVIDUAL WATER CONSUMPTION

BACKGROUND

The present invention relates to the field of metrology and more precisely the analysis and the characterisation of the consumption of any fluid flowing in a pipe. The fluid selected for illustrating an exemplary implementation of the invention is water or a liquid.

In order to best measure and manage the water consumption of a residential or industrial building, or an agricultural or industrial distribution network, it is necessary to know the specific consumption of the devices supplied by the network. The most obvious solution consists in associating with each device an individual meter the data of which make it possible to obtain a dynamic map and to act according to the individual data provided by these meters.

Solutions for the global analysis of the water consumption are also known in the state of the art.

The American patent application US20040128034 describes a solution for analyzing a liquid flow using a microphone or another acoustic sensor to detect the acoustic signature of the liquid flow through a pipe through the analysis of the acoustic signature of water or a liquid flowing through a pipe.

Based on the analysis of the acoustic signature of the liquid flow, a determination is made whether a leak in the line has occurred.

If a determination is made that a fault has occurred, a water shut-off valve is activated ceasing the flow of water or other liquid. The system further includes audible and visual warning devices to indicate whether a fault has occurred as well as the general system status. The system is configured to control the water mains leading into a building or it is configured to control the water leading into a specific hose or appliance such as a toilet or washing machine. The whole building system uses a computer to analyze the acoustic signatures detectable in the house and can determine if one of these signatures has been occurring for a time period outside an acceptable limit and determining that a fault has occurred.

The American patent application US2012/0116693 is also known, which describes a method for measuring the total water consumption in a multi-unit building.

Each unit comprises several water usage appliances. A sensor may be placed on the appliances. The sensor can be an acoustic sensor, e.g. a microphone. The sensor can detect the opening and the closing of the water usage or the water usage level.

The correlation between the consumption of water and the acoustic pressure and/or the spectral distribution of the sound of the water pipe of the unit and/or the appliance can be calibrated for each appliance. A processor unit receives via a wired or wireless network the total usage measurement and the monitoring data and correlates them to generate correlated data to produce data for the measuring of the individual consumption as compared to periods of water consumption. The processor unit is integrated in the meter of the main supply pipe or is positioned outside the building.

The American patent application US2006/0009928 describes the application of specific consumption signatures for characterising devices or detecting anomalies in such devices, used to improve the efficiency of water use. The measured data of the water flow during the use of the devices are transmitted to a microprocessor which is an integral part of a PC or a separate microprocessor, comprising means for informing a water flow controller.

The American patent U.S. Pat. No. 5,040,409 discloses the use of an acoustic sensor for detecting leaks in a sprinkler system. The sensor detects the signals having a different frequency generated by the normal flow or by the leakage of fluid in the pipes.

The American patent U.S. Pat. No. 3,500,676 discloses a method and a device for detecting leaks having a different sound frequency using a transducer comprising a component of the accelerometer type consisting of piezoelectric discs.

The American patent application U.S. 2003/0052790 discloses a system and method for communicating information between a water-meter and a personal computer or an external company.

The European patent EP1887327 discloses an ultrasonic meter comprising a water flow pipe, a piezoelectric sensor, a processor, a memory and an interface for connection to an external device.

The international application PCT WO2011/049957 describes the design of a data transmitter receiver device for a water-meter of the AMR or AMI type having a memory card as a program storage device and an external device with a USB port as an interface.

The solutions of the prior art have several drawbacks.

First, they all require the positioning of an additional device inside the water supply circuit. This implies the shut-off of the water supply, a major action on the pipe or the distribution circuit, and the at least temporary disruption of the network.

Secondly, the solutions of the prior art do not actually provide information individually characterising the water consuming devices, but rather information about the consumption of a sub-set, such as a bathroom or a kitchen.

Solutions belonging to the technological background are also known in the prior art:

The American patent U.S. Pat. No. 6,161,100 describes a system wherein each water-using device is equipped with an individual meter. This is precisely the solution that the invention seeks to avoid.

The international patent application WO2006/110600 provides a device (fixture) provided with an individual sensor.

The European patent EP036658 also describes an ultrasonic flow meter. This sensor comprises two ultrasonic transducers:

the first one emits a wave front in a direction determined relative to the flow flowing in the pipe; and the second one detects the wave scattered after the interaction between the aforesaid wave front and the fluid flowing in the pipe to provide a signal representative of the speed of the fluid in the pipe.

This solution of the prior art teaches neither the object of a single consumption sensor for characterising the consumption of a plurality of water-consuming devices, nor the mode of acquisition of the signals, enabling the characterisation of the specific consumption from a unique item of information.

The Japanese patent application JP 2006-047243 falls within the same technical field as the previous document, namely ultrasonic flow meters and not the characterisation of a plurality of devices through the analysis of the signals using an electromechanical sensor.

It specifies a solution using a clamp easily movable on pipes for enabling quick measurements on an installation.

The European patent GB2082324A discloses a device for monitoring the operation of a fluid flow system comprising a microphone intended to be attached to a pipe of the system for detecting the noise spectrum produced by the operation of the system, for example by the flowing fluid and by the operation of a pump and the associated engine. The noise signals of the microphone are transmitted to a microprocessor unit which controls a visual display unit so that the display unit displays the received spectrum.

Reference data relative to normal and abnormal noises spectra which may occur in the system are saved in the memory. This stored data can control the shut-off of the engine and/or trigger an alarm in case of a dangerous situation.

This document does not relate to the characterisation of the individual consumption of a plurality of devices from a signal acquired at a single point in a network.

The American patent application US 20070044572 relates to an apparatus for measuring the velocity of a fluid passing through a pipe. The apparatus comprises a spatial array of sensors comprising at least two sensors disposed at different axial locations along the pipe, wherein the sensors provide at least one signal indicative of a stochastic parameter associated with a characteristic of the fluid, wherein the characteristic includes at least one of unsteady temperature, density, consistency, transparency, conductivity, capacitance, resistivity and inductance. A signal processor is also provided, wherein the signal processor is configured to receive the at least one signal and determine the velocity of the fluid using the at least one signal.

The sensor is inserted into the pipe for controlling an industrial installation, in order to regulate the flow of a single device.

SUMMARY

The solution provided by the present invention relates to a system and a method for characterising and estimating the individual water consumption of a plurality of devices supplied by the same network, not invasively, avoiding any action on the water distribution circuit.

The solution also makes it possible, therefore, to automatically control a series of devices proportionally to the estimation of the consumption evaluated specifically. This aims at regulating or stopping the flow on a particular circuit and a particular device concerned.

For this purpose, the invention, in its broadest sense, relates to a system for estimating the individual water consumption of a plurality of devices supplied by the secondary water distribution network of a user, characterised in that it comprises a sleeve able to be fitted around the supply pipe of said secondary network comprising an electromechanical sensor applied against the outside wall of said supply pipe, and a processor for analysing the signals delivered by said electromechanical sensor with a view to extracting information characterising the individual consumption of the devices supplied by said secondary network.

The system comprises no source emitting a reference wave, and the measuring does not relate to the interaction between a front of the reference wave and the fluid flowing in the pipe. The sensor is passive, and the analysis focuses on the signal provided by this sensor and not on the modulation signal resulting from the interaction between a reference wave (carrier wave) and the flowing fluid.

The analysis of the global signals with a view to extracting a series of individual information is performed using techniques known to those skilled in the art, for example using a method based on Hidden Markov Models, particularly according to the "K nearest neighbours" technique, or using probabilistic models such as Bayesian networks.

In a first alternative solution, said sleeve comprises means for the remote transmission of the signals delivered by the electromechanical sensor.

In a second non-exclusive alternative solution said sleeve further comprises an electronic circuit for pre-processing the signals delivered by the electromechanical sensor.

Preferably, said processor is associated with a memory for saving a library of signatures of consumption of at least part of the individual devices.

Preferably, said processor is programmed to perform a process of estimation and classification based on the signals supplied by said electromechanical sensor.

In a first alternative solution, said electromechanical sensor comprises a MEMS accelerator sensor.

In a second alternative solution, said electromechanical sensor comprises a piezoelectric sensor.

In a third alternative solution, said electromechanical sensor comprises an electret microphone.

In a fourth alternative solution, said electromechanical sensor comprises a MEMS microphone.

The invention more generally extends to any other alternative solution using an electromechanical sensor for detecting the waves produced by the variations in the liquid flow in a pipe.

In an alternative implementation, the system further comprises at least one valve controlling the supply of at least one of said devices based on said information characterising the individual consumption of at least a part of the devices.

The invention also relates to a sleeve for acquiring signals with a view to estimating the individual water consumption of a plurality of devices, characterised in that it comprises two tubular half-shells linked by a joint enabling the opening thereof so that it can be inserted around a pipe, and the closing thereof so that said sensor can be applied against the wall of said pipe.

The invention also relates to a sleeve characterised in that it comprises means for adjusting the load pressure of the sensor on the outside wall of the supply pipe.

The invention also relates to a method for estimating the consumption of water, or any fluid, of a plurality of devices implemented by the aforementioned system.

The invention further relates to a method for updating the software integrated in a memory card of the SD type or any other type of encapsulated memories.

The invention especially relates to a computer program for the implementation of a system according to the abovementioned invention for controlling a processor for analysing the signals delivered by an electromechanical sensor with a view to extracting information characterising the individual consumption of the devices supplied by a secondary network.

BRIEF DESCRIPTION OF THE DRAWINGS

The invention will be better understood upon reading the following detailed description, relating to a not restrictive exemplary embodiment referring to the accompanying drawings wherein.

DETAILED DESCRIPTION

Figure 1:
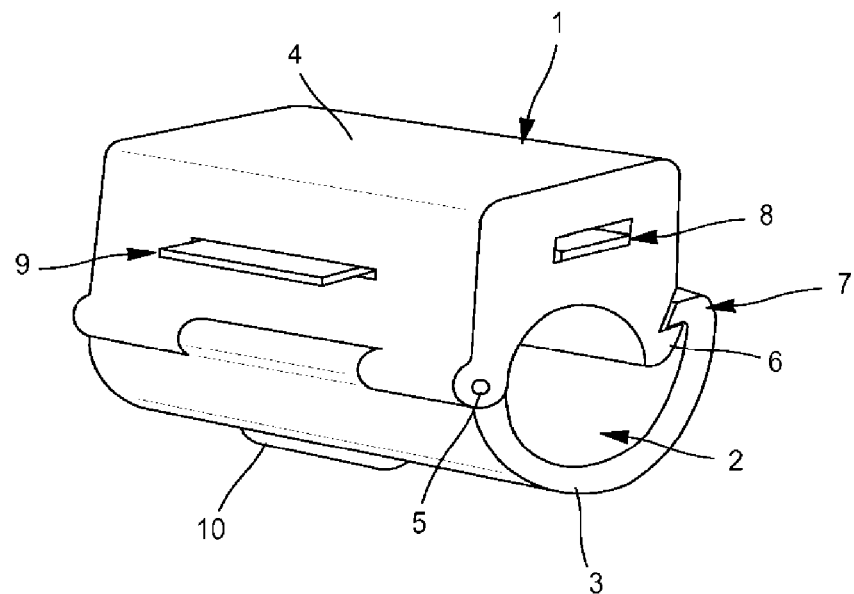
FIG. 1 shows a perspective view of a sleeve according to the invention.
Figure 2:
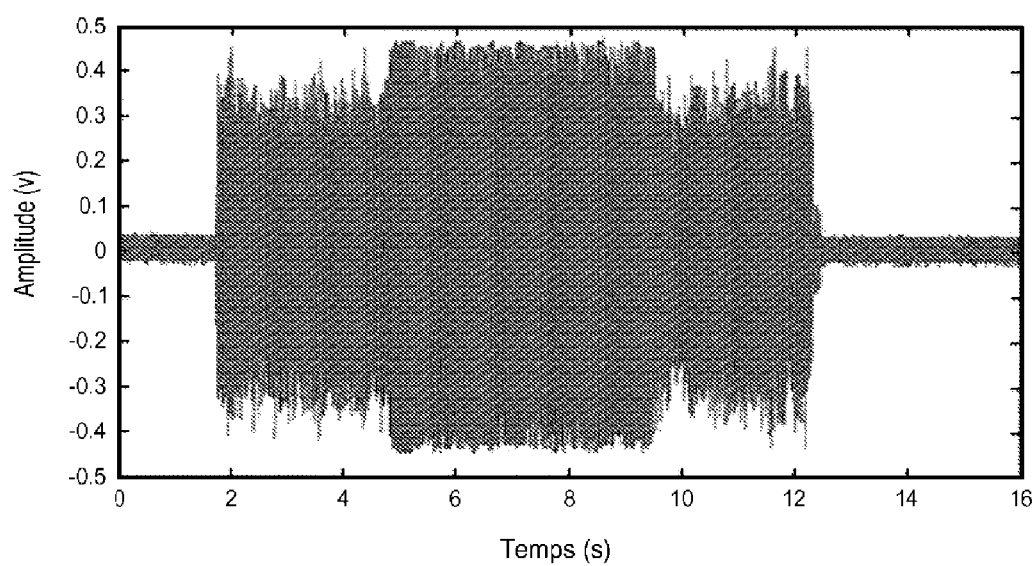
FIGS. 2 to 5 represent the signals detected by various types of sensors.
Figure 3:
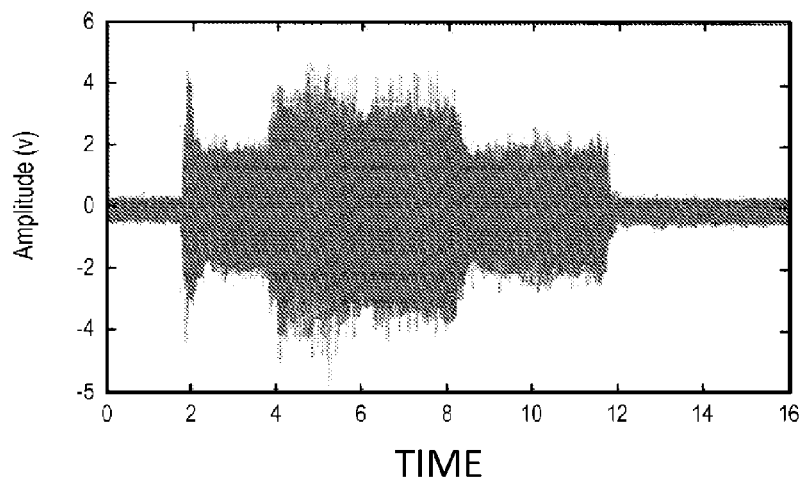
Figure 4:
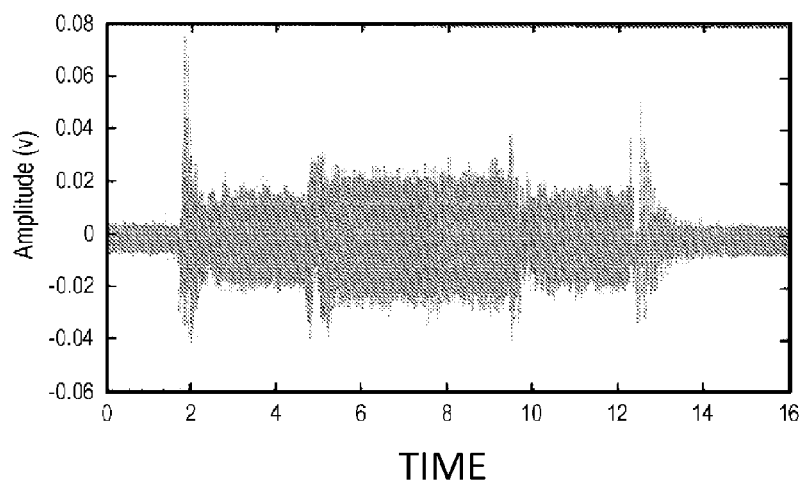

FIG. 1 shows a view of a sleeve according to the invention, consisting of a housing 1 made of plastic material through which a cylindrical bore 2 goes, the section of which is complementary to the section of a water supply pipe.

The sleeve 1 is formed of two parts 3, 4 linked by a joint 5. Each one of the parts 3, 4 has a semi-tubular inside wall, and a locking spoiler respectively 6, 7.

More precisely, the first part 3 has a tile or semi-tubular trough shape with a radius increasing from the joint 5 to the opposite edge.

It has a joint area along one of the longitudinal edges thereof to form a joint with the second part 4. The other longitudinal edge has a shoulder 7 extending radially towards the inside of the part 3. The inner radius of curvature of the first part 3 measured at the spoiler 7 corresponds to the outer radius of curvature of the second part 4 measured at the additional spoiler 6 forming a shoulder adapted to link with the shoulder of the first spoiler 7.

The spoiler 7 has a chamfered longitudinal edge, on the side opposite the shoulder, to enable the introduction of a blade when dismounting the collar.

The sleeve can be opened to allow the adjustment on a water supply pipe, requiring neither water supply shut-off nor any other action thereon.

When the sleeve 1 is positioned around the water supply pipe, the two parts 3, 4 are closed and locked to surround the pipe, with the semi-tubular surfaces of the two parts coming into contact with the outside surface of the pipe.

One of the parts 4 contains an electronic circuit for executing the pre-processing of the signals which are transmitted to a remote processor using a remote wired or radio frequency connection, using the WiFi standard, for instance. Such signals are also saved in a local memory to enable a reading from a device via a USB port 8 or using a memory card 9 of the SIM type for example.

In the example described, the second part 4 incorporates a vibration or acoustic sensor which can be pressed against the pipe wall when closing and clipping the two complementary parts 3, 4.

An adjustment member 10 comprises, for example, a system comprising an adjusting screw interacting with a thread provided in the wall of the first part 3. This screw acts on a cradle positioned inside the first part 3 in order to adapt the section defined by the cradle on the one hand and the second part 4 on the other hand, to the section of the pipe.

The physical parameters measured on the water inlet pipe are selected among the following ones: the acoustic waveform, the deformation or vibration phenomena, passively and not through the emission of a modulated wave front by the flow of the fluid in the pipe.

The parameters do not include the measuring of the interaction between an incident wave, for example a front of ultrasonic waves, and the liquid flowing in the pipe. The measured signals are not those supplied by an ultrasonic flow meter, based on the measuring of the modulation of a carrier wave by the ultrasonic flow rate of a fluid. The devices do not include an emission source associated with the measuring of the modulation of such emission source by the fluid flow.

The sensor according to the invention acts passively, on the detection of the intrinsic signals emitted by the interaction of the fluid with the pipe, and not through the analysis of the modulation of a reference incident wave by the fluid flowing in the pipe.

The sensor is chosen from:
condenser microphones,
electret microphones such as the microphone sold with reference POM-3044-R by the PROJECTS UNLIMITED company,
MEMS microphones, such as the microphone sold with reference ADMP504 by the ANALOG DEVICES company,
piezo-ceramic sensors, such as the component 27301 sold by the FERROPERM company,
resistance strain gauges, and
MEMS accelerometers, such as the accelerometer sold with reference ADXL103 by the ANALOG DEVICES company.

The signals delivered by the sensor are operated by a processor controlled by software intended for automatically classifying and quantifying the categories recognized according to time, frequency, duration and/or intensity variables. The person skilled in the art knows the general probabilistic classification and estimation methods, which use Bayesian models, neural networks or Markow models.

The processing performed for the individual characterisation consists in firstly saving a reference library containing the signature of each one of the devices to be monitored.

Such saving can be predefined or performed upon powering the system according to the invention through the saving of the signal transmitted by the sensor upon powering on and off of a specific device.

Figure 5:
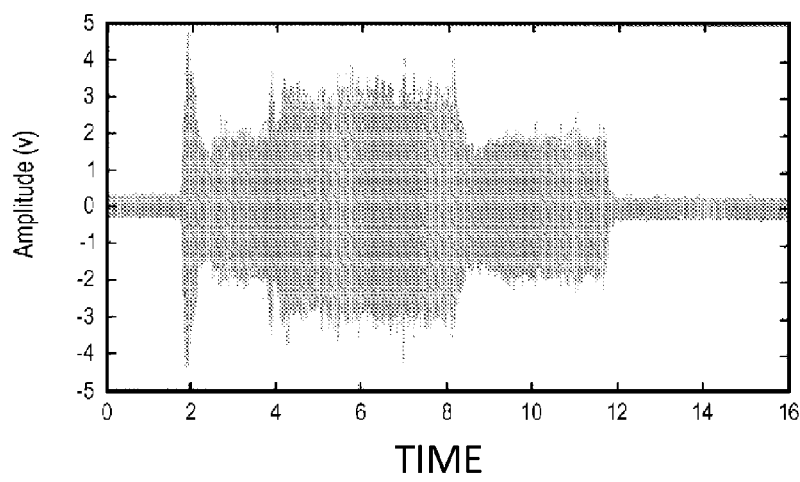

FIGS. 2 to 5 represent the signals detected by various types of sensors, respectively:
An accelerometer sold with reference ADXL103 by the ANALOG DEVICES company (FIG. 2),
A piezo-ceramic sensor sold with reference 27301 by the FERROPERM company (FIG. 3),
An electret microphone sold with reference POM-3044-R by the PROJECTS UNLIMITED company (FIG. 4), and
A MEMS microphone sold with reference ADMP504 by the ANALOG DEVICES company (FIG. 5).

The signals used, in this example, are amplitude versus time.

Figure 6:
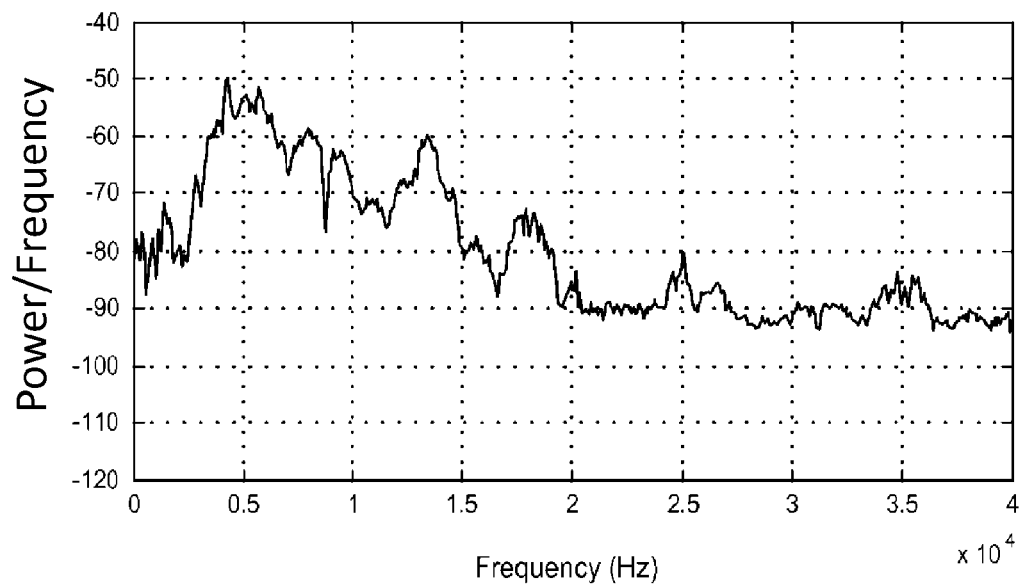
FIGS. 6 and 7 show two other types of signals detected by an accelerometer.
Figure 7:
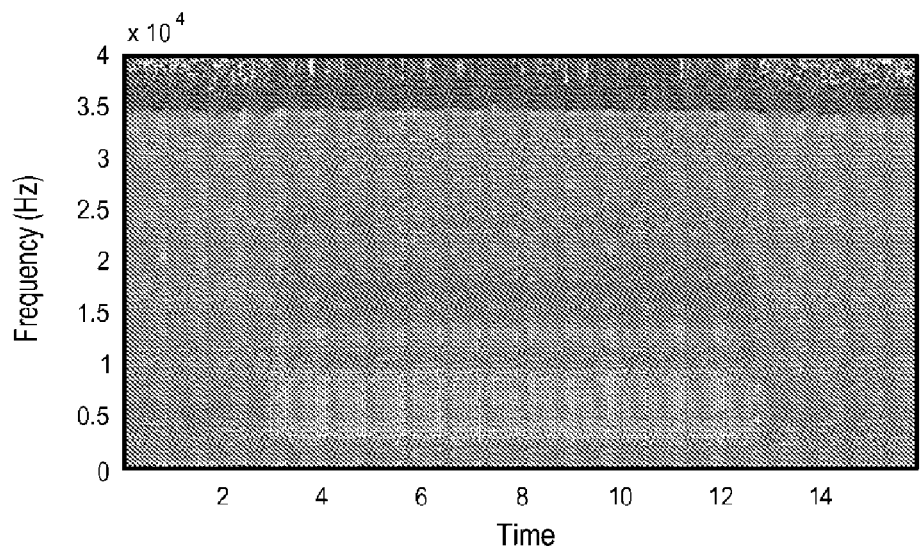

FIGS. 6 and 7 show other forms of signals acquired with an accelerometer, namely:
power versus frequency (FIG. 6), and
the spectrogram (FIG. 7).

These signals are subjected to a pre-processing consisting in sampling the signals and if necessary in carrying out filtering to eliminate the spurious signals, such as ambient sound signals, for instance. For this purpose, the sleeve may further include a microphone to detect the ambient sound signals.

The processing applied to the signals delivered by the sensor aims at assigning signals or signal segments to categories or classes.

The phase of learning comprises the retrieval of descriptors as digital signatures from a base of reference signals.

The classification of the signals delivered by the sensor implements the technique based on hidden Markov models (HMM for Hidden Markov Models), the Gaussian mixture models (GMM for Gaussian Mixture Models) or the dynamic time alignment (DTW for Dynamic Time Warping).

A system of statistical classification models each class of signals using a random variable that is often a Gaussian distribution. The statistical classification is the calculation of the likelihood of the signal belonging to each one of the possible classes, which will determine the most probable belonging class. The calculation uses an acoustic setting of the signal and the class models to be identified.

The Gaussian distribution mixture models (GMM) are used in the case of complex signals where more than one random variable has to be considered.

The classification of sounds using a GMM model includes two steps: a phase of learning of the system using a set of files admitted as representative of a class and a second phase of verification of any sound belonging to this class.

Learning aims at estimating the parameters of the Gaussian distributions that make up the model from the acoustic vectors of the sounds composing the class. The learning of a class can be broken down into two successive steps: first obtaining approximate values of the class distribution parameters using the K-means algorithm, then optimising the values of such parameters using an algorithm of the EM (Expectation Maximisation) type. The phase of classification makes it possible to determine the most probable class from the calculation of the likelihood for each acoustic vector of the signal. The likelihood of the sound composed of a time sequence consisting of several vectors is the geometric mean of likelihood of each one of such vectors. The belonging sound class is the one for which the average value of likelihood is maximum.

The system according to the invention makes it possible to very simply obtain information on all the devices supplied by the water distribution network, without it being necessary to equip each device with an individual sensor.

It may comprise one or more controlled valve(s), with each one being associated with one of the devices or a sub-set of devices. The valve is controlled using the information characterising the individual consumption.

Such information triggers the operating cycle of the devices, for example the shut-off of the supply after a predetermined time.

For example, for an installation comprising a plurality of showers, the centralised detection of the activation of a shower makes it possible to send information triggering the timer to the control circuit of the relevant shower. This solution makes it possible to simplify the design of the controlled valves, while avoiding the integration of a flow sensor in each one of the valves.

The invention claimed is:

1. A system for estimating an individual water consumption of a plurality of devices supplied by a secondary fluid distribution network of a user, comprising:
   a sleeve configured to be fitted around a supply pipe of said secondary network said sleeve comprising a passive electromechanical sensor placed against an outside wall of said supply pipe, and
   a processor for analyzing the signals delivered by said electromechanical sensor with a view to extracting information characterizing the individual consumption of at least part of the devices supplied by said secondary network.

2. The system according to claim 1, wherein said sleeve comprises means for the remote transmission of signals delivered by the electromechanical sensor.

3. The system according to claim 1, wherein said sleeve further comprises an electronic circuit for pre-processing signals delivered by the electromechanical sensor.

4. The system according to claim 1, wherein said processor is associated with a memory for saving a library of signatures of consumption of at least part of the individual devices.

5. The system according to claim 1, wherein said processor is programmed to perform a process of estimation and classification based on signals supplied by said electromechanical sensor.

6. The system according to claim 1, wherein said electromechanical sensor comprises at least one MEMS acceleration sensor, a piezoelectric sensor, an electret microphone and a MEMS microphone.

7. The system according to claim 1, further comprising at least one valve controlling the supply of at least one of said devices based on said information characterizing the individual consumption of at least part of the devices.

8. A computer program stored in a non-transitory storage media for implementing a system according claim 1, for controlling a processor for analyzing signals delivered by an electromechanical sensor with a view to extracting information characterizing the individual consumption of the devices supplied by a secondary network.

9. The system according to claim 1 in which the sleeve includes a microphone to detect the ambient sound signals in order to eliminate spurious signal.

10. A sleeve for acquiring signals with a view to estimating the individual water consumption of a plurality of devices, comprising two tubular half-shells linked by a joint enabling the opening thereof so that it can be inserted around a pipe, and the closing thereof so that a passive sensor can be applied against a wall of said pipe.

11. The sleeve according to claim 10, further comprising means for adjusting the load pressure of the sensor on an outside wall of the supply pipe.

12. The sleeve according to claim 10, further comprising a connector for receiving a peripheral device containing an electronic memory wherein a computer file for updating the computer program controlling the processor for analyzing signals is saved.

* * * * *